（12）United States Patent
Tobey

(10) Patent No.: US 8,414,246 B2
(45) Date of Patent: Apr. 9, 2013

(54) MODULAR HYBRID SNAKE ARM

(75) Inventor: Wayland E. Tobey, Sauk City, WI (US)

(73) Assignee: Cycogs, LLC, Sauk City, WI (US)

( * ) Notice: Subject to any disclaimer, the term of this patent is extended or adjusted under 35 U.S.C. 154(b) by 0 days.

(21) Appl. No.: 12/134,936

(22) Filed: Jun. 6, 2008

(65) Prior Publication Data

US 2008/0302200 A1 Dec. 11, 2008

Related U.S. Application Data

(60) Provisional application No. 60/942,345, filed on Jun. 6, 2007, provisional application No. 60/942,351, filed on Jun. 6, 2007.

(51) Int. Cl.
B25J 18/06 (2006.01)

(52) U.S. Cl.
USPC .............. 414/680; 74/490.01; 74/490.04; 901/1; 901/15; 901/21

(58) Field of Classification Search .............. 414/680; 901/1, 14, 15, 23, 28, 41, 21; 74/490.01, 74/490.04
See application file for complete search history.

(56) References Cited

U.S. PATENT DOCUMENTS

| | | | |
|---|---|---|---|
| 3,060,972 A | 10/1962 | Sheldon | |
| 3,497,083 A | 2/1970 | Anderson et al. | |
| 4,119,900 A | 10/1978 | Kremnitz | |
| 4,367,532 A | 1/1983 | Crum et al. | |
| 4,393,728 A | 7/1983 | Larson et al. | |
| 4,566,843 A | 1/1986 | Iwatsuka et al. | |
| 4,661,039 A | 4/1987 | Brenholt | |
| 4,712,969 A | 12/1987 | Kimura | |
| 4,751,821 A | 6/1988 | Birchard | |
| 4,848,179 A | 7/1989 | Ubhayakar | |
| 5,129,279 A | 7/1992 | Rennex | |
| 5,174,168 A | 12/1992 | Takagi et al. | |
| 5,219,318 A * | 6/1993 | Vranish | 483/16 |
| 5,297,443 A | 3/1994 | Wentz | |
| 5,307,447 A * | 4/1994 | Asano et al. | 700/255 |
| 5,314,293 A | 5/1994 | Carlisle et al. | |
| 5,386,741 A | 2/1995 | Rennex | |
| 5,587,637 A | 12/1996 | Ohyama | |
| 6,408,224 B1 * | 6/2002 | Okamoto et al. | 700/245 |
| 6,575,691 B1 | 6/2003 | Saeki | |
| 6,858,005 B2 | 2/2005 | Ohline et al. | |

(Continued)

OTHER PUBLICATIONS www.ocrobotics.com/applications/security.htm; Feb. 14, 2008; retrieved Feb. 18, 2009 from archive.org.

(Continued)

*Primary Examiner* — Donald Underwood

(57) ABSTRACT

An intelligent modular hybrid robot arm system is usable with mobile robots, and is applicable to stationary industrial arms. The intelligent modular hybrid robot arm system provides a large work envelope and a controlled and directed rotational movement for a flexible snake robot arm. The intelligent modular hybrid robot arm system has the ability to change end effector tools and sensors. The platform computers have the ability to interact with other subsystems for coordinated as well as independent tasks. The flexibly snake robot arm can be covered with a flexible sensor network, or "skin". The intelligent modular hybrid robot arm system can manage its energy use, stores the arm in a compact shape and uses a central support tube offering unobstructed arm access to all sectors of its working envelope.

26 Claims, 9 Drawing Sheets

U.S. PATENT DOCUMENTS

| | | | |
|---|---|---|---|
| 6,925,722 B2* | 8/2005 | Raab et al. | 33/503 |
| 7,228,203 B2 | 6/2007 | Koselka et al. | |
| 2004/0195988 A1 | 10/2004 | Buckingham et al. | |
| 2008/0009975 A1* | 1/2008 | Nakamoto et al. | 700/259 |

OTHER PUBLICATIONS www.willowgarage.com/blog; Feb. 4, 2008; retrieved Feb. 18, 2009 from archive.org.

Anscombe et al, "Snake-Arm Robots: A New Approach to Aircraft Assembly," Aerospace Manufacturing and Automated Fastening Conference and Exhibition, Sep. 2006, Doc. No. 2006-01-3141.

International Preliminary Report on Patentability, PCT/US08/066163, Dec. 7, 2009.

Lyndon B. Johnson Space Center, Tech Briefs, Robotic Arm Comprising Two Bending Segments including Technical Support Package, Apr. 1, 2010.

* cited by examiner

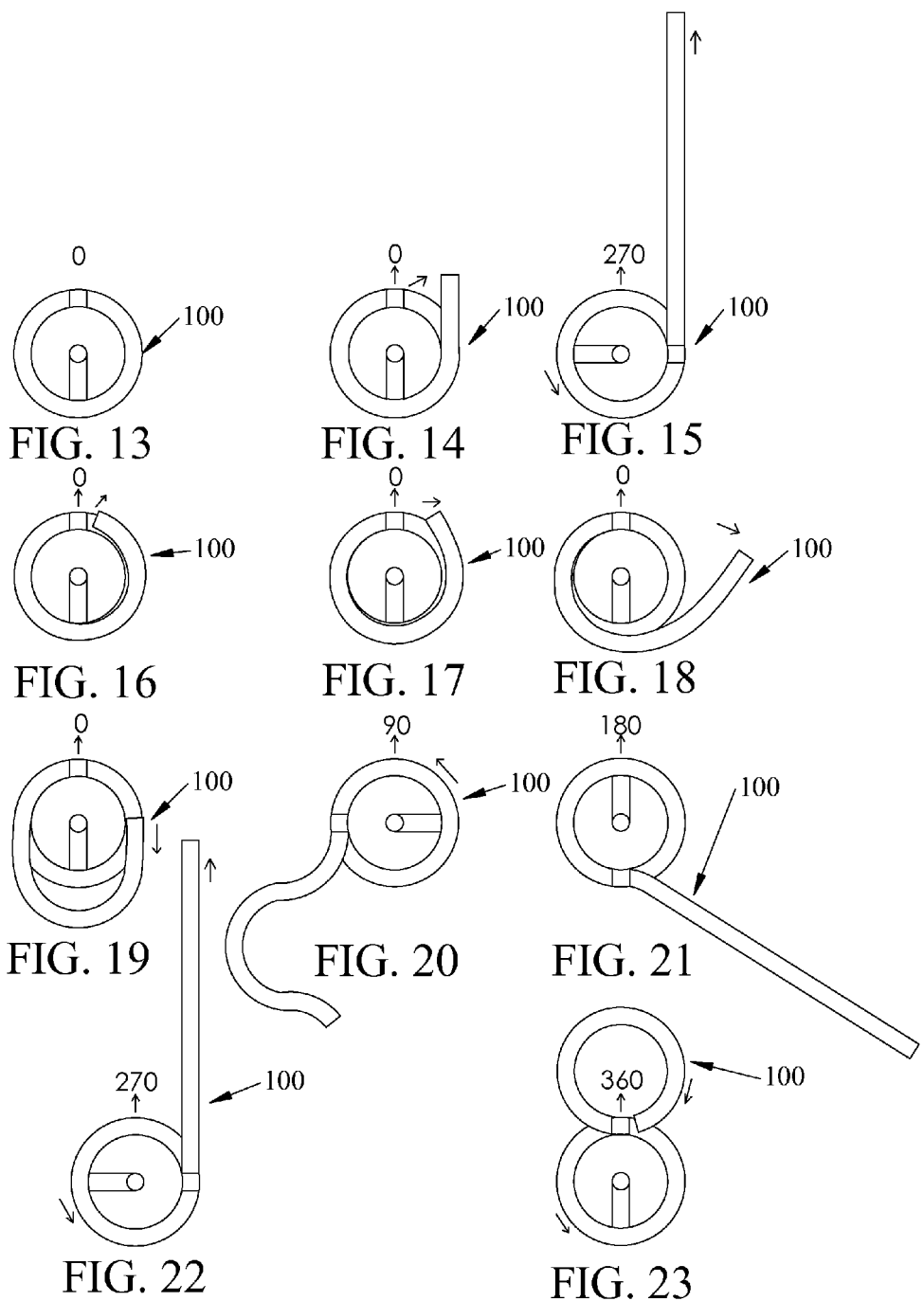

MODULAR HYBRID SNAKE ARM

This application claims priority to U.S. Provisional Applications 60/942,351 and 60/642,345 both filed Jun. 6, 2007, each of which is incorporated herein by reference in its entirety.

BACKGROUND

1. Field of the Invention

This invention is related to modular hybrid snake arms that are usable with mobile robotic devices and systems.

2. Related Art

In the field of robotics, manipulator arms are used extensively by industrial robots and, in some cases, mobile robots. Mobile robots have additional issues that the stationary industrial aims do not have, such as arm storage, weight, and versatility requirements. An acceptable manipulator arm working envelope for an industrial arm may be too confining for a mobile robot. A robot arm's working envelope can be expanded by the use of an arm rotation axis which can provide the arm 360 degree access. Many industrial robot arms incorporate this rotation axis as the primary movement axis.

A flexible or snake arm robot is a computerized electromechanical device with many features found in industrial robotic arms. The "snake" description refers to the arm's long cylindrical shape, which can move in ways that are reminiscent of a snake. The flexible snake aim is a robotic "arm" and the technology has been around for several years with snake arms available commercially from several companies. Most snake arms include a fixed base, or platform, possibly even connected to the end of a larger traditional industrial robot arm, and many elements such as ribs or plates connected in series and moved by wires or cables. Typically, the distance between two edges of the rib plates is changed, and when multiplied by many plates, the combined movement causes the arm to move. The elements, ribs or plates are typically actuated by various mechanical mechanisms, such as gears, pistons, cams, and, more typically, by wires or cables. Many prior art robot arms exist, and when the arms are examined, no solution solves the mobile robot problems.

Previous robot arm designs do not address the mobile robot requirements of compact arm storage, a large working area, and the ability to have 360 degrees of rotational freedom for arm tasks while mounted in a robot, unless the robot arm is located at the top of the robot. The top of the robot location is not an ideal location as the top mounted robot aim creates a larger tipping moment, as well as eliminates potential robot equipment volume that could be located above the robot arm.

SUMMARY OF DISCLOSED EMBODIMENTS

A modular intelligent hybrid robot arm system was developed for use with mobile robots, and is applicable to stationary industrial arms. The hybrid robot arm system is an improvement of compliant robot manipulating systems using a rotary platform for positioning robotic arms. The rotary arm platform provides a large work envelope and multiple modes of operation such as continuous unobstructed 360 degree rotations, and compact arm storage.

The hybrid robot arm system's platform is capable of a controlled and directed rotational movement while the robot arm is manipulated by the hybrid robot arm system's platform on-board computer(s) or processor(s) for arm control, rotational control, data storage, data transfer and/or sensor and/or auxiliary systems control. In addition, the hybrid robot arm system's modular features provide simplified mounting and an easy disconnect. In addition, the hybrid robot arm system has the ability to change end effector tools and sensors, utilizes an open support structure and has the ability to interact with other arms, sensors and subsystems as needed for the arm's tasks.

In general, the hybrid robot arm may be covered with a flexible sensor network, or "skin" to sense and protect both the arm, objects in the environment and any biological entities it may be in proximity to. The hybrid robot arm system sensors help to sense the environment as well as help protect the surroundings and for arm navigation. It is envisioned that such hybrid robot arms can be useful for any task, such as found in general business, manufacturing, the household, and medical fields as well as other work environments.

The arm and platform combination can also provide additional features such as an end effector, electrical features, and mechanical features. Such features can range from end effector spot lights, cameras, communication links, even projectiles such as paint balls to spraying water or fire retardants.

This invention provides a system usable to manipulate objects.

It is also to be understood that the following claims are intended to cover all of the generic and specific features of the invention herein described and all statements of the scope of the invention, which, as a matter of language, might be said to fall there between. It should also be understood that features described with respect to one embodiment might be used as features in another embodiment.

This invention separately improves upon robot arm designs and has several advantages over prior art designs by solving the following issues.

This invention provides a robot arm for a mobile robot having 360 degrees of continuous platform rotation for rotating one or more arms about a central axis with no arm obstructions. The arm's platform can rotate in any direction, speed, or acceleration, as well as stationary arm positioning coupled with platform rotations, to follow work in progress with access to all areas around the robot in its available work envelope.

This invention separately provides a compact arm storage structure where the robot arm can curl around the platform for a compact storage mode, possibly located within the boundaries of a circular robot.

This invention separately provides an end point or end effector that is positional over a large working envelope or to apply a force. The envelope expansion is accomplished, for example by attaching a snake arm robot tangentially, or located near the outer circumference to a rotatable platform.

This invention separately provides a arm that is capable of moving in translation, rotation, and to move in a spiral or coil like fashion, as well as to move left, right, up, or down by using the rotary platform and the robot arm.

This invention separately provides an end effector capable of performing automated tool or sensor changes. For example, if such tools are located within its working area or in the robots body, the arm can reach and exchange end effector components.

This invention separately provides a support tube with a large open area that provides a passage for wires, tubes, etc. The support tube provides a support structure to an upper chassis section. The support tube expands the arms working ability with no chassis obstructions.

This invention separately provides a modular assembly as well as modular components which can be detached from the chassis or framework easily, facilitating construction, maintenance and calibrations.

This invention separately provides intelligent local onboard computing that can communicate and work together with other subsystems. Data is stored for a short time and transferred to other systems.

This invention separately provides an energy management system for the hybrid arm by using the local computers that control the platforms components and modes of operation.

This invention separately provides a cost effective arm platform, with reduced arm manufacturing cost, using the flexible snake arm composed of a series of identical or similar plates or ribs.

BRIEF DESCRIPTION OF THE DRAWINGS

For a fuller understanding of the nature and objects of the invention, reference should be made to the following detailed description taken in connection with the accompanying drawings, in which:

FIG. 13 is a schematic sectional view of the exemplary embodiment of the hybrid robot snake arm and platform of FIG. 1 fully retracted and coiled up at 0 degrees;

FIG. 14 is a schematic sectional view of the exemplary embodiment of the hybrid robot snake arm and platform of FIG. 1 partially extended in tangential extension;

FIG. 15 is a schematic sectional view of the exemplary embodiment of the hybrid robot snake arm and platform of FIG. 1 fully extended in tangential extension;

FIG. 16 is a schematic sectional view of the exemplary embodiment of the hybrid robot snake arm and platform of FIG. 1 beginning to uncoil;

FIG. 17 is a schematic sectional view the exemplary embodiment of the hybrid robot snake arm and platform with the snake arm partially uncoiled;

FIG. 18 is a schematic sectional view of the exemplary embodiment of the hybrid robot snake arm and platform with the snake arm partially uncoiled in extension with an end effector clear of the chassis;

FIG. 19 is a schematic sectional view of the exemplary embodiment of the hybrid robot snake arm and platform with a bump or loop arm extension;

FIG. 20 is a schematic sectional view of the exemplary embodiment of the hybrid robot snake arm and platform extended and rotated to a first position;

FIG. 21 is a schematic sectional view of the hybrid robot snake arm and platform extended and rotated to a second position;

FIG. 22 is a schematic sectional view of the hybrid robot snake arm and platform extended and rotated to a third position;

FIG. 23 is a schematic sectional view of the hybrid robot snake arm and platform extended and rotated to a fourth position;

DETAILED DESCRIPTION OF EXEMPLARY EMBODIMENTS

Figure 1:
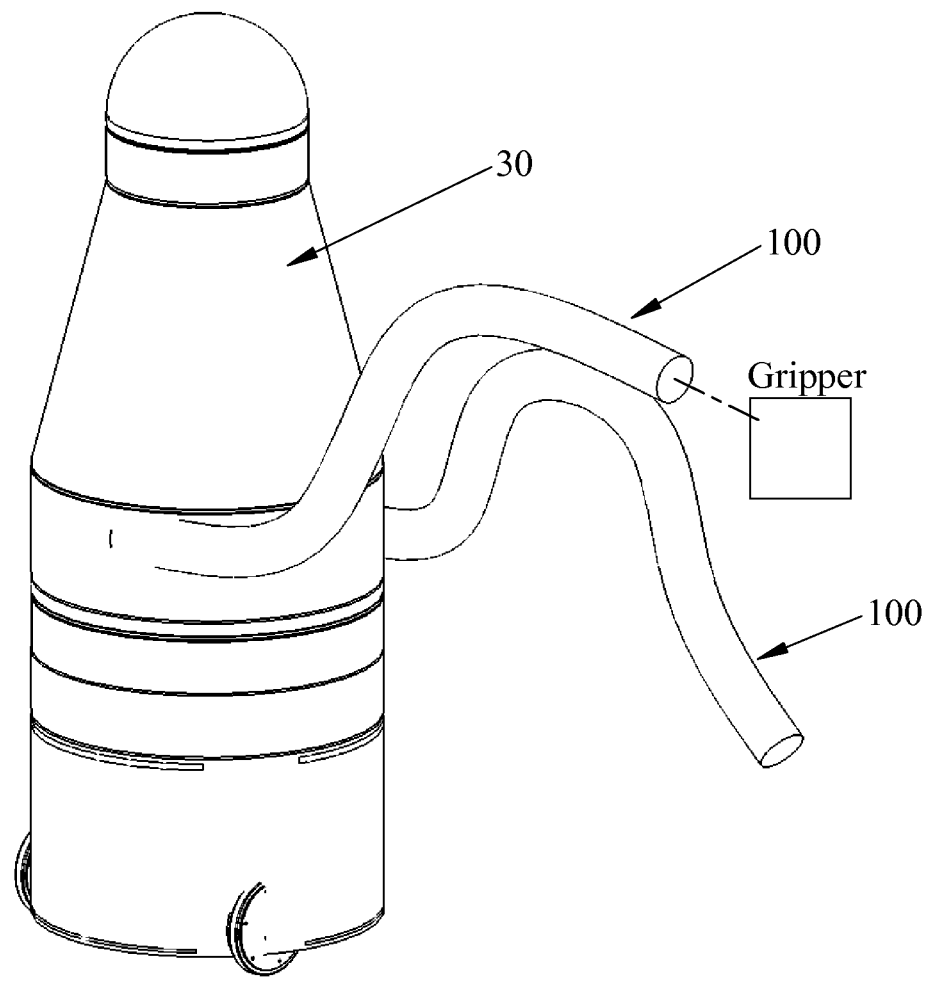
FIG. 1 is a perspective view of an exemplary embodiment of a hybrid robot snake arm according to this invention installed in a cylindrical chassis mobile robot showing a platform usable with the snake arm.

FIG. 1 shows a hybrid robot arm system, which is an improvement of robot manipulating systems using a rotary platform for positioning robotic arms.

As shown in FIG. 1, the hybrid robot arm system provides an advanced robot arm system for a mobile robot that has a large working envelope and the ability to be stored in a compact form, preferably inside the robot. Most industrial robot arms are composed of fixed links, swivels and pivots. Industrial robot arms can be folded into a smaller shape. However they do not lend themselves for uses in mobile robotics. Industrial robot arms provide a high repeatable positional accuracy and high load ratings, in part due to their rigidity and fixed mountings. An industrial robot arms' rigidity has advantages for such tasks as precise welding and manufacturing. In a mobile robot, the robot can be moving as well as operating off a soft surface like padded carpeting, which makes the precise repeatable positioning capacities of an industrial robot arm inaccurate and/or unnecessary. For uses where high speed, high load capability and/or absolute repeatable positioning are not needed, and/or have larger tolerances, a different arm type can be used.

In various exemplary embodiments, the arms of mobile robot will encounter more obstacles and biological entities. A compliant or "springy" robot arm is preferred in such environments. The flexible arm robot, also called the snake arm robot, solves the storage, working envelope, obstacle avoidance and compliance issues. The snake arm can navigate or flow around obstacles and is compliant. The compliance feature allows the arm to work more safely, while collisions with objects are minimized and/or are softened by "giving" upon contact. Full force may not be applied immediately, giving the arm controls time to react.

The following exemplary embodiments of a mobile robot utilizes a robotic snake arm of our own design with some elements being actuated by a cable drive or other mechanical mechanisms.

Figure 2:
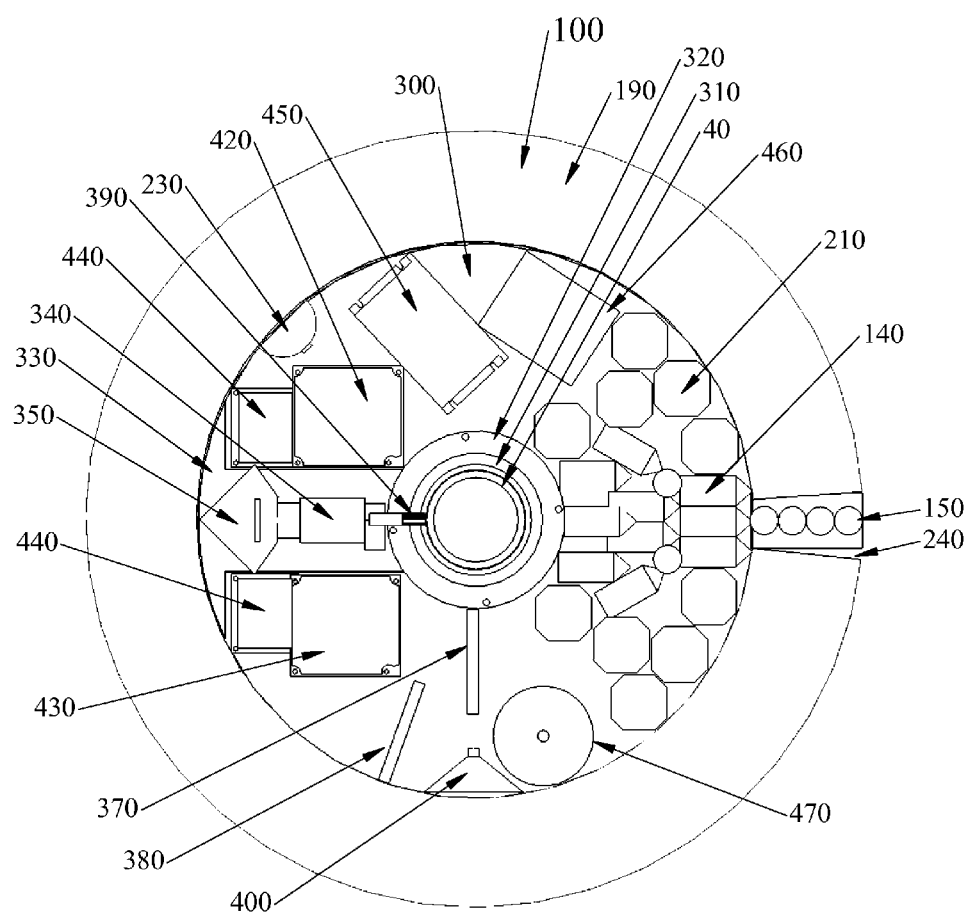
FIG. 2 is a top sectional schematic view of the hybrid robot snake arm and platform of FIG. 1 located about the central axis of a mobile robot.

Most conventional snake arms are a round tube-like appendage, separately attached to the arms' actuators and controls. The actuators and controls are usually separate from the arm sections to reduce the arm dead weight and to allow more room for the controls. Thus typical snake arms resemble a box with a flexible hose projecting from the middle of one side. The convention snake arm can reach any location inside its working envelope. The working envelope typically is a circular light bulb shape, as the arms can flex in any direction. Some dead spots will occur at the conventional snakes arm's minimum bend radius zones. Some dead zone coverage is possible if the arm is long enough to curl around itself. To expand this envelope, the whole flexible snake arm system would need to be reoriented. Some industrial arms have been fitted with a snake arm as an end effector. For a mobile robot this apparatus is too large and heavy. FIG. 2 shows a mobile robot with a rotary platform 300 usable for attaching and manipulating a snake arm 100. By locating the snake arm 100 on the rotary platform 300 the working envelope is expanded. Furthermore the actuators and controls of the snake arm 100 can be located on the rotating platform 300. This rotating platform 300 can also be used with industrial arms 250. It should be appreciated that, in various exemplary embodiments, the snake arm 100 may be replaced with any suitable known or later-developed robotic arm or similar attachment.

Figure 8:
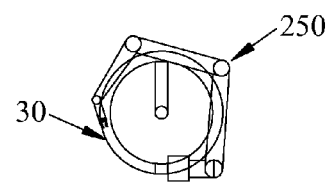
FIG. 8 shows a typical industrial robotic arm installed on the platform of FIG. 1.

As shown in FIG. 8, using a controlled rotary platform 300 combined with a moveable robot aim such as the snake arm 100, as well as a typical industrial type robot arm 250, creates a hybrid arm design according to this invention. FIG. 1 shows a mobile robot system. The snake arm 100 is attached to the computer-controlled rotary platform 300 near an outside edge, as shown in FIG. 2, allowing the snake arm 100 to be rotated at any speed, direction or acceleration the system is capable of reaching. This provides an expanded movement space, called the working envelope.

Figure 12:
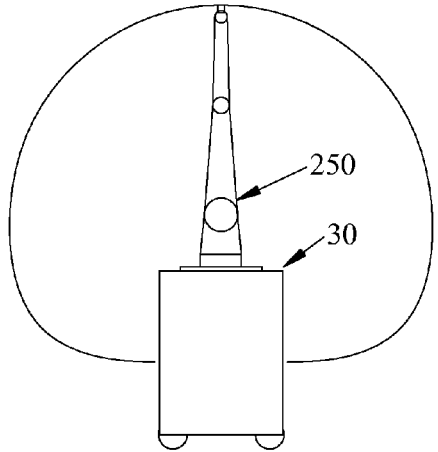
FIG. 12 is a schematic view of the working envelope of a typical industrial robotic arm when mounted on top of a mobile robot.

FIG. 12 shows the working envelope of a mobile robot 30 using an industrial arm 250 located on the top of the robot. It should be appreciated that no equipment or chassis can be located or installed on the top of the industrial arm 250 without creating an obstacle that the arm 250 will collide with, which would prohibit 360-degrees of arm rotation. Similarly, positioning an industrial arm 250 on the top of the robot 30 may limit the ability to use a tall robot. In some cases, the arm 250 may also have problems reaching the floor, and has limited reach beyond the body of the robot 30. The top mounted industrial arm 250 may provide a method to fold or otherwise store the arm 250 within the footprint of the robot 30.

Figure 11:
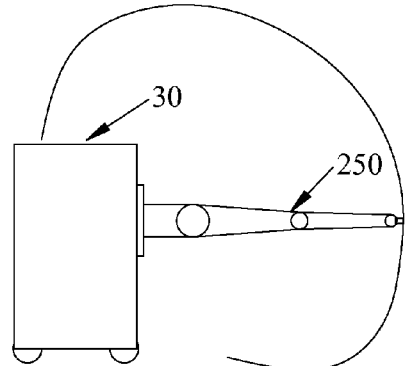
FIG. 11 is a schematic view of the working envelope of a typical industrial robotic arm when mounted on the side of a mobile robot.

FIG. 11 shows the working envelope of the mobile robot 30 using an industrial arm 250 mounted on the side of the robot 30. As shown in FIG. 11, this mounting position allows a taller robot 30 with some reduction in the working envelope of the arm 250. However, the protruding arm 250 has storage problems and cannot be stored within the footprint of the robot 30. This may cause navigation issues, such as when moving though doorways or turning around in a confined space. In some cases, the robot 30 can only reach 360-degree arm rotations by rotating the body of the robot 30. This may be difficult if the robot 30 is traveling down a hallway and needs to move the arm 250 from the front of the robot 30 to the rear of the robot 30.

Figure 7:
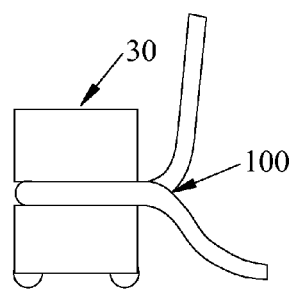
FIG. 7 is a schematic view of the hybrid robot snake arm and platform of FIG. 1, showing possible elevation movements.
Figure 9:
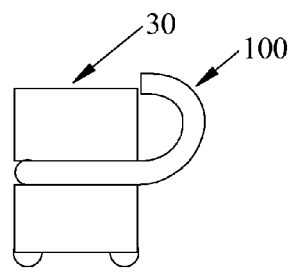
FIG. 9 is a schematic view of the hybrid robot snake arm moving to touch a chassis of the robot.

FIG. 7 shows the working envelope of a mobile robot 30 with two flexible snake arms 100 according to this invention. As shown in FIG. 7, the snake arms 100 can move to sweep out a large working envelope. FIG. 9 shows a partially extended snake arm 100 curling upon itself. It should be appreciated that the minimum bend or curl radius may create one or more non-reachable dead zones.

Robot arm end effectors are well known in the art, and several companies manufacture end effectors such as, for example, claws, pinchers and hands. Furthermore automated end effector changing systems 240 are also commercially available, allowing the end effector to exchange, for example, a claw for a hand.

Figure 10:
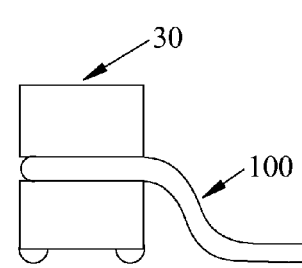
FIG. 10 is a schematic view of the working envelope of the exemplary embodiment of the hybrid robot snake arm and platform according to this invention when used with a mobile robot.

End effectors such as claws, hands, etc. can be positioned in the large volume of the workspace envelope. The working envelope of the system combines the workspace of the snake arm 100 and the workspace of the rotary platform 300 for a 360-degree spherical or donut-like works space, depending on the shape of the workspace of the arm. FIG. 10 shows the workspace of the snake arm 100. The rotary platform 300 can be rotated in any direction or heading, and is also capable of continuous 360-degree rotations. The snake arm 100 can move to its location from any starting point. Different speed or acceleration profile modes can be used to move the snake arm 100 as the robot position controls dictate. The movements of the rotary platform 300 are not limited to simple rotations or moving to a heading. The rotary platform 300 can work to track the work zone of the arm, as well as to rotate for arm extension needs.

As shown in FIG. 2, the rotary platform 300 can be co-axially located with other systems and components of the mobile robot 30. The rotary platform 300 rotates about this axis point, and this axis point can be co-located, or co-axially located within a cylindrical robot body 30, as well as co-axially located with other subsystems, like rotating sensor rings as disclosed in copending U.S. patent application No. 60/942,351, filed Jun. 6, 2008, which is incorporated herein by reference in its entirety. This enhances the end effector positioning and force capabilities of the snake arm 100. This hybrid robot arm system is usable for mobile robots and stationary or industrial arm type applications.

The rotary platform 300 is typically circular in shape, which minimizes or eliminates protrusions that extend outside the body of the robot 30 as the rotary platform 300 rotates inside the robot 30.

It should be appreciated that, in various exemplary embodiments, the rotary platform 300 can take such forms as of a ring, disk, cylinder, or torus (donut). It should be appreciated that, in various exemplary embodiments, a particular shape may be preferred, such as, for example, a cylindrical spool shape for use with a snake arm 100 having a length longer than the platforms circumference length. In this example, the excess arm length can be wound up on the spool.

It should also be appreciated that the platform can contain more than one arm, such as two small snake arms 100 that are used for delicate or light duty tasks where the two arms work together.

As shown in FIG. 2, the rotary platform 300 will typically be circular in shape and contain one or more snake arms 100, the associated arm mechanisms and controls, end effector equipment, tooling and sensors, on-board or embedded computer(s) and/or processor(s), a rotational drive system, position encoders, power supplies, and/or a rotary power and signal coupler. One advantage in including all of the components in or on the rotary platform 300 is a removable module with minimum external mechanical and electrical or other linkages. Mechanical force is only applied to the platform bearings and the rotary drive mechanisms.

Figure 24:
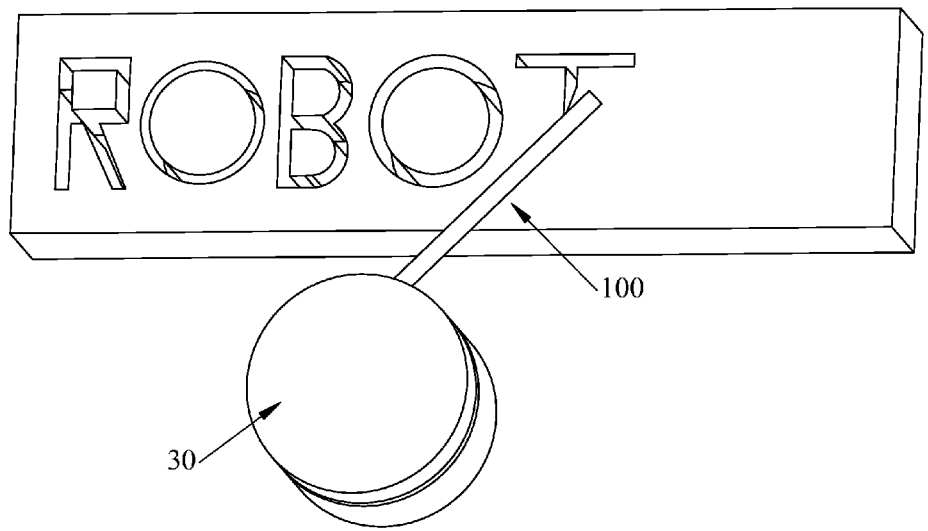
FIG. 24 is a schematic view of the exemplary embodiment of the hybrid robot snake arm and platform being used in manufacturing for sign writing or an engraving application.

It should be appreciated that, as shown in FIG. 24, in some embodiments, these components may be located in another, off-platform location. For example, for industrial applications not needing 360 degrees of rotation, the rotary platform 300 may be depopulated of the electronics, and even some actuators 140 can be remote to the platform. This may not be an ideal configuration as maintenance of some components may be involved and may require extensive disassembly at the workspace. Furthermore, the snake arm 100 can provide a mobile robot 30 with the maximum chassis interior volume by providing a configuration that allows for the snake arm 100 to be stored in a compact shape around the rotary platform 300.

The arm storage design shown in FIG. 2 provides a balance between the minimum arm curl radius and the outer diameter of the rotary platform 300. A highly flexible arm requires more actuators, which take up more room on or in the rotary platform 300 that may prevent a more compact shape of the rotary platform 300. A less flexible, or larger, outer diameter arm cannot curl as tightly, resulting in a large radius for the rotary platform 300. Ideally, the arm curl diameter should be less than the diameter of the rotary platform 300. The smaller curl diameter allows a snug fit of the arm around the platform. The small curl diameter can also be used for an arm movement to change end effector tooling 230 located on the rotary platform 300 itself.

Figure 3:
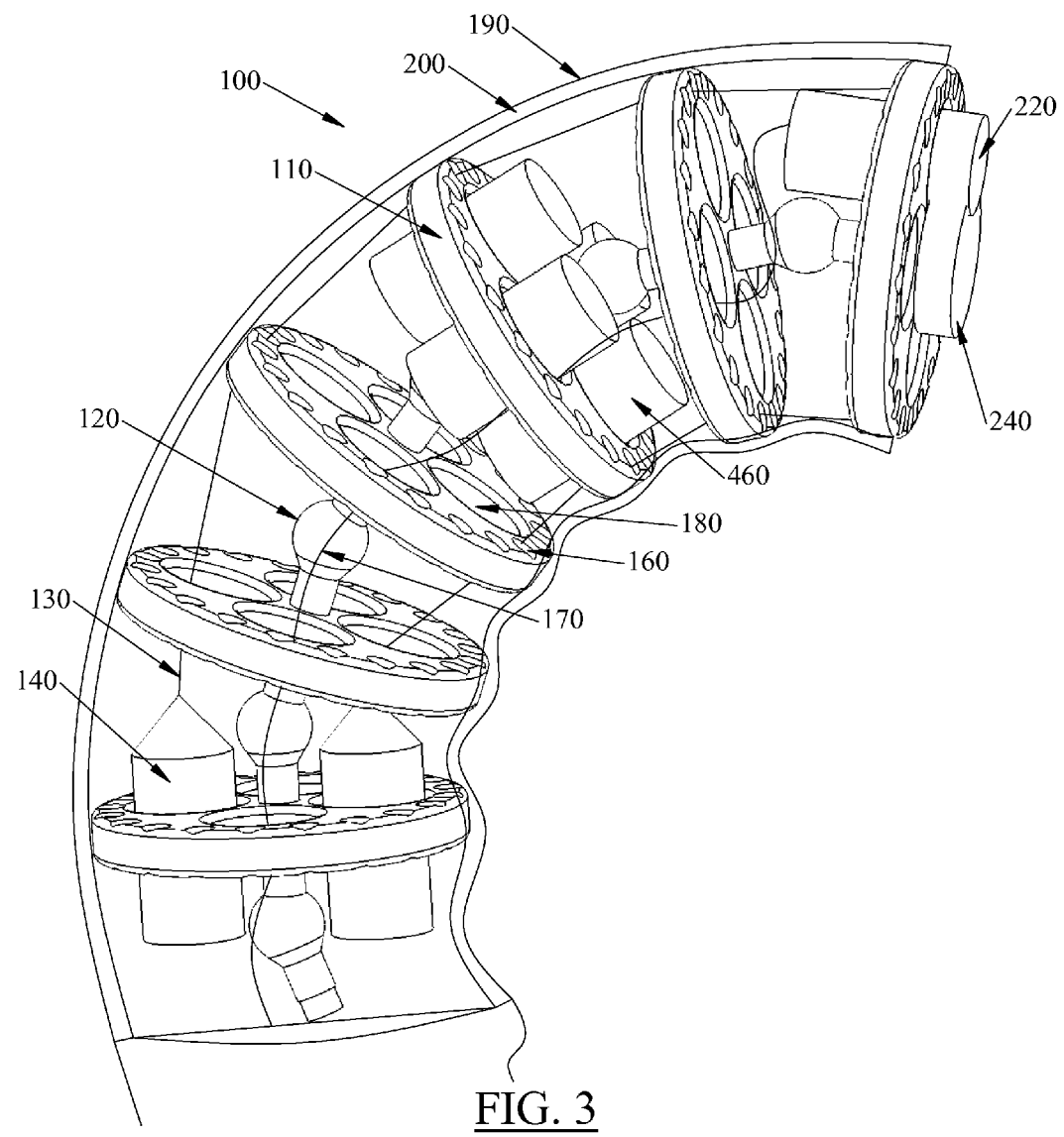
FIG. 3 is a schematic view of a typical snake arm segment usable with the exemplary embodiment of the hybrid robot snake aim and platform according to this invention.

One particularly appropriate arm for the application is the snake arm 100 shown in FIG. 3. Note that sensors are needed to monitor the movements of the snake arm 100 around the rotary platform 300 to prevent damage or injury as the snake arm 100 can pinch and spin into such items as wires, clothes and hands.

Figure 4:
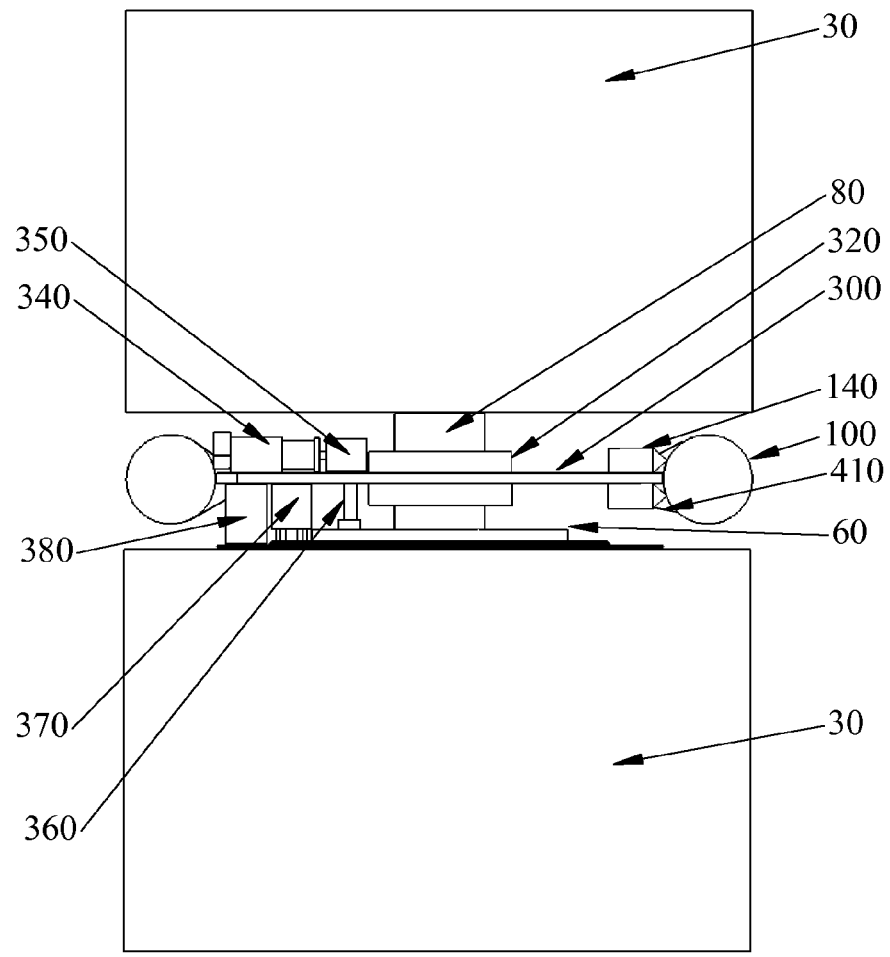
FIG. 4 is a side schematic view of the exemplary embodiment of the hybrid robot snake arm and platform of FIG. 1 located about the central axis of a mobile robot.

FIG. 4 shows a side schematic view of a snake arm 100 interfaced with a mobile robot 30 according to this invention. As shown in FIG. 4, the interface includes a rotary platform 300 and a snake arm 100. The rotary platform 300 is mounted on a central tube 40 or shaft with bearings 310 for platform support, arm load transfer and support with ease of platform rotation. This mounting can be co-axial to the rest of the mounting, vehicle or system. The rotary platform 300 is driven in rotation by a drive system motor 340 and gear reduction 350. The rotary platform 300 is connected both mechanically and electrically to the mounting structure or chassis. Such electrical connections may include signal and/or power connections.

The snake arm 100 is attached to the rotary platform 300 such that the base of the snake arm 100, or root mounting, is connected near the outer edge of the rotary platform 300 such that the base of the snake arm 100 allows an increase in the working envelope of the snake arm 100. In contrast with a typical industrial robot arm 250, such as the robot arm 250 shown in FIG. 8, would have its base mounted tangentially, such that the first axis of the industrial arm 250 works in elevation, enabling the arm to "fold up" or curl around the outer circumference of the platform for storage. The ability to store a robot arm in a compact state provides a robot the ability to move in confined spaces, as well as to turn around without having collision issues with the protruding arms that are used in other designs.

As outlined herein, a flexible or snake arm attachment, such as the snake arm 100, is particularly well suited for use with a rotary platform 300 according to this invention. The snake arm 100 may also be called a flexible tube structure, tensor arm, flexible frame, flexible positioning appendage, flexible body, multi-articulated manipulator, serpentine arm, and/or snaky or snake-like arms. These flexible or snake arms 100 comprise a plurality of movable links or "elements" 110 as shown in FIG. 3. These elements 110, e.g., ribs, plates, etc., are jointed in series. Such elements 110 can be designed and manufactured to create identical interchangeable parts. The manufactured elements enable a large economy of scale production of the same part. These series of elements are connected by interconnecting actuators 130 or 140, which are engaged between the separate elements and act on those elements to produce motions or forces. These actuators 130 or 140 usually employ a flexible power transmission ability, which is needed as the snake arm 100 flexes. Such interconnecting actuators 130 or 140 may include motor driven cables, wires, tendons, and/or control lines, as well as various electromechanical, hydraulic, pneumatic, and/or other actuating systems. Furthermore, flexible snake arms 100 may use various types of joints 120 to maintain a desired shape and alignment, such as, for example, universal joints, springs, ball joints, sockets and/or elastomers and the like, etc. In addition, some snake arms 100 have one or more hollow open passageways 180 between the elements 110, such that actuators 130 and/or 140, wires, tubes and other parts or mechanisms can be placed inside the snake arm 100.

In general snake arms 100 typically employ actuators 130 and/or 140, such as wires or cables, to create a pivoting motion or action between the elements 110. The actuators 130 and/or 140, wires or cables are typically grouped or segmented to move a subset series of plates or elements 110. To move or position a snake arm 100, a portion or segment of the snake arm 100, such as the first ⅕ segment of the arms actuators 130 and/or 140 are activated. This is followed by a second group of actuators 130 and/or 140, wires or cables that are connected to the next ⅕ segment of the arm, and so on. The actuator 130 and/or 140, wires or cables are driven by, for example, powered wind tip spools, powered bell cranks, linear drives and/or other mechanisms 140.

Segments actuators 130 and/or 140, wires or cables are free to slide through the intermediate segment plate elements 110 while the force is being applied and terminated at the target segment end elements 110. This allows the target segment's actuators 130 and/or 140 to move only the targeted segment. One segment typically uses at least four actuators 130 and/or 140, one per quadrant, for such movement directions as Up, Down, Right, and Left. It should be appreciated that, in various exemplary embodiments, fewer than four actuators 130 and/or 140 may be used if less defined movement is needed. Likewise, various exemplary embodiments may use more than four actuators to provide more accurate movement.

Each element's quadrant of the flexible snake arm 100 can be acted upon using one or more actuators and/or 130, cables or wires to enable the multiple movement types. For example, with four actuators 130 and/or 140, one per quadrant, the pair of up, and down actuators and the pair of left and right actuators each uses one actuator 140 each. In various exemplary embodiments, the speed and torque capacities of each actuator 140 are fixed. In these exemplary embodiments, multiple actuators 130 and/or 140 may be used for each quadrant to provide more arm speed and/or force options. In various exemplary embodiments, each actuator 130 and/or 140 can be sized for a specific speed and torque range. The quadrant actuator group can work independently, or cooperatively, depending on the mechanical connections. For example, consider a cable actuator 130 and/or 140 based on a wind-up spool. The spool is directly driven by a high-speed motor. A low-speed, high-torque motor drive can be engaged as needed, by using a solenoid operated pinion gear, much like a car starter. This allows a high-speed arm movement and a low speed high force arm movement.

As shown in FIG. 3, in various exemplary embodiments, these actuators 130 and/or 140, e.g., wires or cables, typically work as pairs, located on opposing sides or quadrants of the snake arm 100 and near the outside edge to provide the largest lever moment possible. Each pair of actuators 130 and/or 140, wires or cables operate in an opposing fashion. It should be appreciated that FIG. 3 shows only two of the four actuators 130 and/or 140 that may be desired, and that this pair of actuators 130 and/or 140 can, for example, operate the Left-Right curl movements.

To move the snake arm 100, the actuator 140 on a side furthest from the desired direction of motion releases tension, while the actuator 140 on the side nearest the desired direction of motion increases tension. As a result, the snake arm 100 moves in the desired direction. If used, actuating wires or cables 130 for the next segment are typically encased in a load bearing flexible cable sheath such that when tension or compressive loads are passed through the sheath, no appreciable length or dimension changes occur. This, in effect, does not alter the snake arm segment where the cables 130 pass through, as the flexible sheath carries the arm position forces past arm segments where the force is not needed.

The snake arm 100 can be attached to the rotary platform 300 such that the snake arm 100 is mounted tangential to the outer circumference of the rotary platform 300. FIG. 4 shows a side view of the snake arm 100 and rotary platform 300. As shown in FIG. 4, the snake arm 100 is located inboard of the robot 30 or vehicle chassis and is on the edge of the rotary platform 300. FIG. 2 shows a top view of the snake arm 100 and rotary platform 300. As shown in FIG. 2, the arm storage effect is similar to winding thread onto a bobbin. With the snake arm 100 attached to the rotary platform 300, the aim can be coiled around the outer edge of the rotary platform, creating a compact circular shape for storage. In various exemplary embodiments, the snake arm 100 may be located inside the chassis 30 or body, which limits any projecting parts from colliding with objects it encounters, such as a robot moving through a narrow doorway.

FIGS. 13-23 show various patterns and configurations of the snake arm 100 at various levels of extension and contraction. As shown in FIG. 13, the snake anus 100 can be wrapped into a tight curl or circle. As shown in FIG. 15, the snake arm 100 can be extended in any desired direction. As shown in FIGS. 13-23 various other combinations of lines and curves are achievable with various arm extensions, curl radius and segment combinations. The combination of the snake arm 100 and the rotary platform 300 offers a nearly unlimited variety of curves, positions and orientation combinations as well as end effector positioning options.

FIG. 10 shows the working envelope of a mobile robot 30 with an exemplary embodiment of a snake arm 100. As shown in FIG. 10, using the additional axis of rotation of the rotary platform 300 allows an expanded working envelope. The minimum curve radius of the snake arm 100 may create some positioning dead spots, along with constraints such as fixed boundaries, like the floor or ceiling. The snake arm 100 is capable of performing work within the spherical or donut-shaped working envelope region located concentrically about the robot 30 or platform axis. As shown in FIG. 20, the snake arm 100 is also able to traverse a convoluted path, such as flowing around obstacles to place the end effector at a given location. In addition, the snake arm 100 and rotary platform 300 can cooperate as the snake arm 100 extends, such as from the circular coiled storage position. As shown in FIGS. 13-15, one type of extension of the snake arm 100, a tangential translating aim extension, operates much like extending a retractable tape measure.

To perform the tangential translating arm extension, from the stored position shown in FIG. 13, the snake arm 100 first straightens out the end segment in an uncurling fashion as shown in FIG. 14. Then the snake arm 100 and the rotary platform 300 work together, to match uncurling rate of the snake arm 100 with the rotary rotation rate of the rotary platform 300 to produce a linear extension of the snake arm 100. FIG. 15 shows the snake arm 100 fully extended. The snake arm 100 can be retracted by performing the same procedure in reverse. With this type of operation, the snake arm 100 can be extended just enough to do the work needed, as shown in FIG. 14.

Another type of extension from the circular coiled storage position shown in FIG. 13 is to uncoil the snake arm 100 in a spiral like extension. This is basically an expanding swinging arc. The rotary platform 300 does not need to rotate and the snake arm 100 coiling and uncoiling operations are illustrated in FIG. 16 as the coiled snake arm 100 starts to uncoil. The individual arm segments can all act at the same time to perform the uncoil operation. FIG. 17 shows the snake arm 100 uncoiled and extended from the rotary platform 300. FIG. 18 shows the snake arm 100 uncoiled past the outer robot body 30. Rotating the rotary platform 300 is not required, but may be used as an aim navigation aid to thread the snake arm 100 around an obstacle. Another type of extension from the circular coiled storage position is where the snake arm 100 can extend a segment outside the boundaries of the robot 30 or platform 300, like a bump or loop as illustrated in FIG. 19.

With these extension methods, the snake arm 100 can be positioned with any combination of movements of the snake arm 100 and rotary platform 300. The snake arm 100 can be positioned, as well as moved using flowing arm movements, by using the rotary platform 300. The rotary platform 300 and snake arm 100 combination allows the end point or end effector to be placed at any point in its workspace, as well as being capable of continuous movements of the snake arm 100 and the rotary platform 300.

FIG. 20 shows the rotary platform 300 rotated 90 degrees with an extended snake arm 100. The snake arm 100 is shown in a curved orientation, such as for maneuvering around an obstacle. FIG. 21 shows the rotary platform 300 rotated 180 degrees with a maximum snake arm 100 extension. Note that the snake arm 100 turns away from the rotary platform 300 to achieve the maximum reach. FIG. 22 shows the rotary platform 300 rotated 270 degrees with a straight arm 100 extension in a tangential direction. FIG. 23 shows the rotary platform 300 rotated to the 360, or 0-degree point. The snake arm 100 is curled in the opposite direction from what is used for storage. This is also the same effect as shown in FIG. 19 for the loop extension where the snake arm 100 is taken to the opposite limit.

The snake arm 100 and rotary platform 300 motion ability is needed to manipulate objects such as tools and to position the snake aim 100 or its end effector, as well as to apply a force. The snake arm 100 is not limited in any pattern, speed or direction that is permitted by the systems commands and design.

It should be appreciated that the movements of the snake arm 100 and rotary platform 300 cannot occur instantaneously; that is, the actuators 130 and/or 140 require time for acceleration and deceleration. The rotary platform 300 is a compliant robot arm when used with a flexible snake arm 100, as the flexible or snake arm 100 provides a spring effect. Furthermore, this feature provides the snake arm 100 with the option to ramp up loading or forces, whether picking up an object, or in a collision. The compliance of the snake arm 100 may allow time to stop the movement of the snake arm 100 before full force is applied. This compliance feature is useful when working near people, as it gives both the person and the snake arm 100 time to respond before full force is applied.

The combination of the snake arm 100 and the rotary platform 300 offers fine load ramping positioning, and the ability to give when an external force is applied to the snake arm 100. These compliant characteristics are similar to the behavior of human hands trying to thread a needle, or while arm wrestling.

The rotary platform 300 is modular in both construction and as a module for a larger system. As shown in FIG. 2, the rotary platform 300 is at least partially self-contained, and features a quick disconnect or removal that requires minimal disassembly to disconnect the rotary platform 300 from its supports. The rotary platform 300 requires a simple mechanical mounting, and basic power and data communication connections. In various exemplary embodiments, the rotational drive is located in the rotary platform 300, driving a stationary gear 60, chain, belt, pulley, and/or direct drive that is located on the chassis 30. This integrates all the functionality into one drive unit, allowing for better movement integration, maintenance and simplified chassis design. In various exemplary embodiments, the rotational drive includes the platform rotation drive motor 340, the gearbox 350, and the pinion gear shaft 360 that extends into the stationary platform gear 60, as shown in FIG. 4. The platform drive location simplifies the wiring as well as allows local control of the drive for position control. In various exemplary embodiments, an encoder is included on the position motor 340 for motor speed and position information. A cooling fan 400 may be needed to cool the electronics and the drive motor 340. The stationary chassis 30 supplies the bearing and support structures, and the stationary drive reaction linkage 60 (e.g., gear, chain, belt, pulley and/or direct drive, etc.). Data from the platform rotation position sensor(s) may be obtained, for example, by an electrical or optical encoder having stationary portions 50 mounted on the chassis 30.

Using both the absolute chassis position encoder and the rotation drive motor 340 encoder provides the information needed for determining the position of the rotary platform 300, as well as speed and rotational direction. Furthermore, the computer 420 can determine the position of the rotary platform 300 without a homing sequence. A two-section rotary coupler 70 and 370 or slip ring transfers the power and signal or data communications between the fixed chassis section 70 located on the stationary chassis 30, and the rotary section 370 located on the rotary platform 300. The slip ring design can be manufactured in any size and allows the easy positioning of the two sections. The slip ring design also allows the transfer of other media. Furthermore, this rotational coupler arrangement can be used to transfer other media, such as air samples for gas analysis, fire retardant, coolant, water, paint balls, etc. For implementations where total rotations are less than 360-degrees, a flexible cable harness can also be used. Communication methods between the chassis and platform for data and commands can be of any type, such as wired, optical or wireless (such as, e.g., radio wave or IR) connections.

Figure 6:
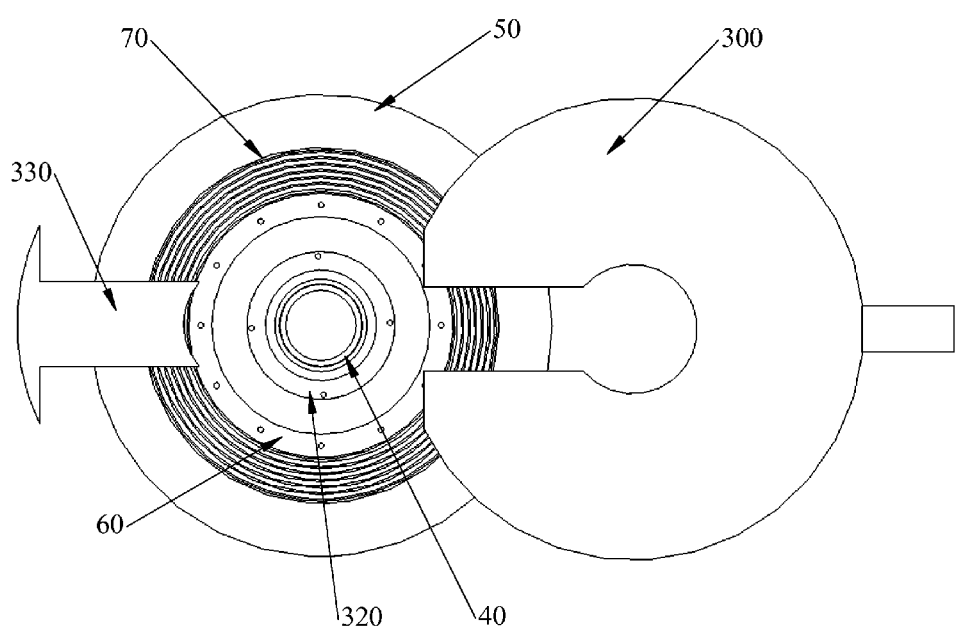
FIG. 6 is a schematic view of the exemplary embodiment of the hybrid robot snake arm and platform of FIG. 1, with the bearing plug removed.

In various exemplary embodiments, the platform rotation bearing 310 and the bearing retainers 320 may need to remain mated to the central support tube 40. The bearings support the rotary platform on the central support tube 40 and transfer any arm related forces into the chassis 30. When removing the modular rotary platform from the chassis 30, the bearing retainers 320 are released from the rotary platform 300. This allows the bearings 310 to separate from the rotary platform 300. A bearing "plug" or removable platform section 330 is removed to allow the remaining portion of the rotary platform 300 to pass around the central tube 40. Removing the rotary platform 300 will leave the bearings 310 behind, as they remain connected to the central tube 40. This provision allows the snake arm 100 and/or the rotary platform 300 to be removed without major disassembly of the rotary platform 300, robot 30 or mounting structure. With the bearing plug 330 removed and the bearings 310 separated, the rotary platform 330 is lifted out of the chassis 30 as shown in FIG. 6. It should be appreciated that, if the rotating bearings 310 ever need to be replaced, the chassis 30 may need to be disassembled.

The components of the snake arm 100 and/or the rotary platform 300 are also modular as installed on the rotary platform 300, and can be easily removed, such as removing the rotation drive motor 340, or the computer modules 420. The snake arm 100 and/or the rotary platform 300 can be operated with some loss of functionality while disconnected and sitting on a workbench or table. For bench top or table operation, with the proper duplicated support structures, such as a central tube 40 for the bearings 310, the stationary components of the drive mechanism 60, the encoders 50 and the rotary coupler 70 as well as power and communications, the snake arm 100 and/or the rotary platform can perform most of its functions while removed from the installed chassis 30 or structure. If no rotary platform rotational movements are needed for the workbench needs, only power and communications are needed.

Robot arms perform work, and to perform work the end effector is moved and positioned as needed. Some tasks will require different mated end effector appendages, such as a brush for painting or a gripper to open a door. The ability to change end effector tooling and sensors is enhanced with the combination of the snake arm 100 and the rotary platform 300. The expanded movement or work envelope allows more access to tools and sensor storage locations. Such storage locations can be located in or on the body of the robot 30, or external to the robot 30, in various locations such as a tool crib. Such exchangeable tools and sensors may include claws, pinchers, hooks, hands, drills, brushes, rollers, cameras, laser scanners, etc.

The robot arm end effector can employ a camera 220 embedded inside the snake arm 100 for aligning and coupling with different tools and sensors as well as for guiding the installed tool to its task. Objects, such as the camera 220, can be positioned in the snake arm's hollow passageways 180, as shown in FIG. 3. In addition, the camera 220 can monitor the work in progress of the snake arm 100. Different tasks will require the ability for the arm end effector to change its tooling and sensors. Sensors mated to the end effector can also be changed or exchanged, to allow for the detailed investigation of an item of interest, such as a gas detector or radiation sensor. End effector uses include such tasks as robot self repair, tool use, or for inspection under a car looking for explosives. Such end effector tool changing 240 is known in the art and is used with industrial robots.

The typical snake arm 100, as illustrated in FIG. 3, or even a typical industrial robot arm 250, when used with the rotary platform 300 according to this invention, may require a "skin" 190. Such a "skin" 190 may be fashioned out of a flexible material and may include such features as a stiffener for the robot arm, a sensor and control network and compliant padding 200. The outer surface may be fashioned out of a non-skid cloth or plastic. The skin 190 can be supplemented with a soft compliant backing 200 such as foam padding, tactile sensor fibers such as "hair" or "whiskers", outer skin colorants and visual patterns, embedded parts such as electrical components or fiber optics, as well as sensors and temperature regulating mechanisms, etc. The snake arm 100 will function without the skin 190 but is more limited in its applications.

The skin 190 can be equipped and operated as a flexible sensor network for detecting contact with another object, such as with a force or weight detector, tactile sensors, and hair-like sensors. These sensors enhance movements of the snake arm 100 in close proximity to objects without substantial physical contact against the object with the main arm segments. Furthermore, the arm skin 190 can be labeled or colored in any pattern as well as covered with a "clothes" layer for such uses as ease of arm cleanup in dirty areas like those found in a food processing plant. The skin 190 may also contain displays, controls and E-Stop switches. The arm sensors and controls may aid in aim "teach" activities for setting up repetitive motions such as moving an arm segment to a desired position by pressing on that section of the snake arm 100. The skin 190 also protects both the snake arm 100 and objects the arm may contact in its environment from light scuffs and collisions by the compliant padding 200 as a bumper. Furthermore, the compliant padding 200 can also limit injury or discomfort to any biological entity within close proximity to the aim.

Figure 25:
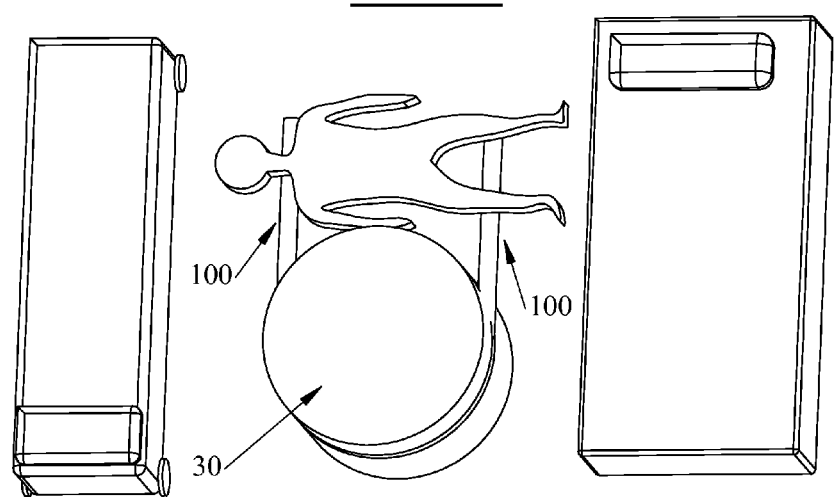
FIG. 25 is a schematic view of a mobile robot using two exemplary embodiments of the hybrid robot snake arm and platform being used in a medical or nursing type application for such tasks as lifting and moving patients or equipment.

The compliant padding 200 minimizes any point sources of pressure from mechanical contact, which is useful for tasks such as, for example, carrying a dog, or lifting an injured patient, as shown in FIG. 25. Furthermore, the compliant padding 200 increases the applied surface area for more traction, such as, for example, to minimize slipping or shifting when carrying a box. The skin 190 and compliant padding 200 must stretch and contract as the snake arm 100 flexes without adding undue resistance to the movement of the snake arm 100 during stretching as well as without adding undue bunching-up resistance when undergoing compression as found inside a curling snake arm 100. Some implementations may need the skin 190 and compliant padding 200 to comprise small overlapping sections. Such overlapping sectioned skin 190 can minimize the elongation or contraction effects down to the element 110, rib or plate level. Such sectioned skin 190, or "scales", may also enhance maintenance of the snake arm 100 by allowing access to any section of the snake arm 100, as well as maintenance operations where opening or replacing just a small section of the snake aim 100 or skin 190.

The snake arm 100 according to this invention has two types of sensor locations, embedded or internal sensors and external end effector sensors. Internal sensors include positional sensors, such as for the platform rotation, that are implemented using electrical or optical encoders. Such encoders can be used separately or in any combination of incremental and absolute encoders. If position measurements are implemented using an incremental encoder, a mechanism for locating the actuators home or zero position as well as a mechanism for tracking the current position count are desirable. An absolute encoder 50 and 380 is recommended for the arm platform measurements. The internal arm sensors also include the arm actuators 140 for measuring tension and position sensing to relay such information as the position and orientation as well forces and loads of the snake arm 100.

Other internal sensors that may be used with the snake arm 100 are the rotation drive motor 340 encoder, component temperature sensors, motor amperage, voltage sensors and/or any other known or later-developed embedded sensors. The sensor count is limited by such factors as sensor cost, sensor weight, available physical space, power requirements, and/or heat loading.

The skin 190, if equipped, is also considered an internal sensor and can operate as a flexible sensor network for detecting contact with another object, by sensing with pressure or weight detection and tactile and hair like sensors for movements in close proximity to objects without substantially physically contacting the object with the main arm segments.

The end effector or the exchangeable external sensors can incorporate a multitude of sensor types such as audio sensors, optical and video sensors, environmental sensors, electromagnetic sensors and tactile sensors. End effector sensors can be positioned for sensing uses as well as changed or exchanged with other sensors. Changing sensors allows for the detailed investigation of an item of interest, such as using a gas detector or radiation sensor on a suspect item. Sensor data and arm and platform position data are referenced to time and can be overlaid, combined or "fused". Any combination of raw or fused sensor data can be used locally on the platform or transferred to an external location from the arm platform. Sensor data can be collected using any method, such as polled, synchronous or asynchronous data transfer modes.

The sensor data can be stored in such locations as a data array in memory or in a database table. Local data storage limitations may limit the long term logging and/or archiving of the data collected in the computer 420. For storage, data can be transferred to another computer or data storage medium located in the robot 30, the vehicle or in an external location. The sensor calibration and qualification of the robot 30 or vehicle, can also be enhanced and automated using the snake arm 100 and rotary platform 300, such as, when the robot 30 is docked, the snake arm 100 or rotary platform 300 can be positioned to align with and connect to suitable calibration fixtures for each sensor's calibration needs As shown in FIGS. 2 and 4, the rotary platform 300 uses a hollow central support tube 40 or structure to provide a strong mounting and force transfer site. The hollow support tube 40 includes a large diameter tube or structure which can provide room inside the tube or structure for the placement and routing of equipment, mechanisms, pipes, cables, wires, etc. able to traverse the rotating arm area. Other platform designs limit this area by having a solid shaft or one with a small diameter.

Figure 5:
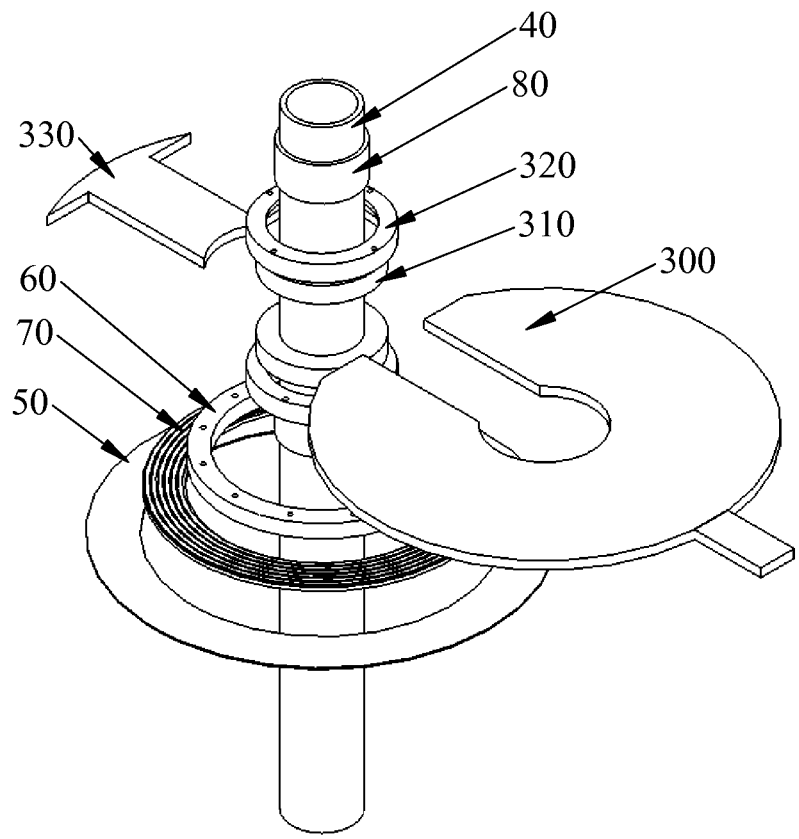
FIG. 5 is a schematic perspective view of an expanded central axis bearing arrangement usable with the platform of FIG. 1.

The hollow support tube 40 is typically a thick walled structure, sized for the installation of large diameter commercial bearings 310. FIG. 5 shows the expanded platform-to-chassis components. The exterior surface of the hollow support tube 40 is used as the bearing 310 inside mating surface. Using the large diameter bearings 310 provides for large bearing load carrying capacity. Depending on the arm loads, a tapered bearing 310 set may be used instead of roller bearings 310. In addition, the hollow, thick-walled tube 40 provides the structural strength to carry the arm loads as well as any additional chassis components 30 located above the rotating snake arm(s) 100. With the central tube support system the rotary platform 300 is clear of any chassis or bodywork obstructions for 360-degree arm access.

To isolate the snake arm 100 or any robot/vehicle-induced bumps, shocks and vibrations, the rotary platform 300 can use cushioned bearings 310 with isolated mountings 320 to provide for a smooth arm operation and reduce disturbances forced into the chassis. The base of the hollow support tube 40 is attached to the robot, vehicle or chassis in a secure manner. The mounting should insure that the support tube 40 is mounted so it is accurately aligned to the chassis. It may be beneficial to design this attachment to be removable in the event of repairs. The chassis and support interface also requires accurate positioning of the rotary coupler's stationary section 70, the stationary platform drive gear 60 and the stationary section of the encoder 50. The stationary elements are attached to the chassis surface 30 next to the rotary platform 300. A support tube spacer 80 may be needed to slide over the support tube 40 to set the height of the rotary platform 300 relative to the chassis 30. The bearing retainers 320 are slipped over the support tube 40, followed next by the bearing 310, to complete the rotary platform's lower bearing set. The upper bearing set is a mirror of the lower set and comprises the bearing 310, the bearing retainer 320 and the spacer 80. When removing the rotary platform 300, a bearing spreader may be used to separate the bearings 310 from the rotary platform 300 to ease its removal and re-installation.

As shown in FIG. 1, multiple hybrid robot arm systems, comprising rotary platforms 300 and/or snake arms 100, can be installed on a single robot 30. Such multiple hybrid robot arm systems can be configured in a stacked configuration, a back-to-back configuration, and/or the like, as well as in different locations on the robot's chassis or at the industrial plant floor. Multiple hybrid robot arm systems can provide additional manipulating and dexterity options, load capacities, and/or more workspace coverage, as well the ability to perform independent and divergent manipulator tasks. Furthermore, the hybrid robot arm system can communicate with other sub-systems, such as a robot mobility wheel control system, to coordinate arm movements with the robot vehicles movements.

The hybrid robot arm system can cooperate with another hybrid robot arm, as well as any other robot arm, for coordinated tasks by sharing data, as well as using shared data. For example, the hybrid robot arm system can track a modular sensor ring as it rotates around the robot's body while sharing the sensor ring's data between the main computer and other subsystems to plan and perform work with the arms. Such cooperation can also avoid aim collisions, as well as collision avoidance of objects, such as when the arm navigates a convoluted path around obstacles.

The hybrid robot arm is considered intelligent due to having one or more local computers or processors 420 and computer based intelligent components 430. The embedded computer(s) or processor(s) 420 can communicate with the rest of the system that is located externally to the rotary platform 300. Such subsystems can include other robot arms, other sensor platforms, a central computer bank or complex, as well as external systems or entities, such as those found on the Internet. In various exemplary embodiments, the remote Internet operation can be used for teleoperation tasks. The onboard local computer or processor 420 can receive work projects, commands or task timings and can coordinate with the other components and subsystems. The onboard local computer or processor 420 makes the local aim decisions and controls the snake arm 100 to proceed with the work it was directed to do. The embedded computer(s) or processor(s) 420 are usually first to discover collision issues and can act upon these events immediately as the embedded computer 420 is capable of processing the local sensors, data and directly controlling the local movements of the snake arm 100. Furthermore, the local computer(s) or processor(s) 420 can determine the complex movements to manipulate the hybrid robot arm system in part or wholly, with the overall direction supplied from sources external to the hybrid robot arm system. As an example, as the hybrid robot arm system performs work, sensor readings combined with the positions (s) of the actuators 140, provides a representation of the snake arm 100 in its workspace.

It should be appreciated that the computation processing, electronics and some components can be fully or partially located off the rotary platform 300, such as with current-generation industrial robot arms and related control cabinets. Offloaded computer processing is an advantage when one or more snake arm 100 need to coordinate their movements. The main computer may be needed to oversee the hybrid robot arm system coordination at a higher level.

The rotary platform 300 may contain an energy management system for its power consumption and energy reserves. Overall robot system commands that are sent to the hybrid robot arm system are given priority, such as commands to "power off" or go to "full power", to "sleep" or to "awake", to "recharge" or to "conserve energy", or some combination of these and other desirable commands. The hybrid robot arm system thermal management also can control energy use, such as slowing down the snake arm 100 or turning off a hot arm actuator 140, as well as turning on a cooling fan 400. As an energy management example, the hybrid robot arm system can be commanded to go into a reduced power mode by using a slower computer clock cycle and slower arm movements.

Power can be delivered to the rotary platform 300 by the rotary coupler sections 70 and 370 and is routed through the power management controls 450, which include switchable power supplies or converters 440, power-monitoring circuits 430 and/or an uninterruptible power supply (UPS) 450 and/or 460. The UPS 450 and/or 460 includes one or more energy storage devices 460, such as a set of batteries or capacitors. Power filtering and management circuits can be used to provide a clean source of power for the computers and sensors.

In addition, the UPS 450 and/or 460 serves as a sink for any sudden heavy current draws, as such may occur when actuating the rotation 340 or arm actuator 140 motors. The power management system also receives E-Stop commands from the robot and/or vehicle's overall system, as well as having one or more local manual E-Stop buttons or switches. Manual E-Stop controls can be located on the rotary platform 300 and at locations on the snake arm 100. When the E-Stop is activated, the E-Stop event can disconnect the UPS 450 and/or 460 and the chassis power provided to the rotary platform 300. In addition, the rotary platform 300 uses an anti-static or ground brush 390 to ground any charges or stray voltages. The brush 390 helps maintain a safe operation as well as cleaner sensor readings and possibly avoids damage to the bearings 310 due to stray voltages.

The energy storage devices 460, such as the batteries or capacitors, can be located on the rotary platform 300 as well as located inside the flexible robot arm segments 180. Capacitors with higher power to weight ratios over batteries can be located in the arms to efficiently use the available space without incurring large weight penalties that the arms actuators must work against.

The hybrid robot arm system can interact with its environment by, for example, using tools, moving objects, operating equipment, opening doors, positioning cameras for a better view, etc. The hybrid robot arm system can also employ output projector systems, such as, for example, a fire retardant or water spray system 470, a paint ball ejector and/or other projectile launchers. An end effector spot light and camera 220 can provide views in obstructed locations, such as, for example, under a car, in a shipping container or around the corner of a building. The end effector can also be used to connect to a data port, such as an office network jack. By the use of end effector tooling, the snake arm 100 can manipulate objects within its design limitations, much as we humans manipulate objects. Additionally the arm segments themselves can be used for picking up and carrying objects, such as with the bump or loop arm extension as shown in FIG. 19 and FIG. 23. The bump or loop arm extension can be used to carry a box or an injured patient. FIG. 25 shows two hybrid robot arm system, each comprising a snake arm 100 and a rotary platform 300, installed on a mobile robot 30 as a nurse's assistant. The snake arms 100 can pick up a patient, and move the patient from a bed onto a gurney. In addition, the snake arms 100 can ease nurse workloads and perform patient physical therapy.

FIG. 24 shows one hybrid robot arm system, comprising a snake arm 100 and a rotary platform 300, used as an industrial robot arm where the snake arm 100 is writing on or etching an object. As shown in FIG. 24, the flexibility of the snake arm 100, coupled with the multiple extension modes, provides a compact low profile robotic arm.

In addition, the arm segments can move objects by pushing on them, much like we humans use our elbows to open a door with our hands full. Additionally, within limits, the hybrid robot arm system can be used to act on its own mobile robot 30 or stationary robot system for such tasks as self-repair. Other potential abilities include connecting to a wall socket for recharge power, operating switches and other equipment, typing on a keyboard and moving a mouse, exchanging media like tapes and optical media, delivering supplies, operating door locks and keys, fueling vehicles, etc. The hybrid robot arm system is not limited in use, and can be used in such activities as assembly or manufacturing, construction, research, education, security, military, medical, transportation, household tasks, etc.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

The invention claimed is:

1. A robotic arm assembly adapted for use with a mobile robot chassis, comprising:
   an arm platform rotatably connectable to a mobile robot chassis;
   at least one robotic snake arm attached to the arm platform;
   a rotary drive capable of applying force between the are platform and the mobile robot chassis to rotate the robotic arm assembly relative to the mobile robot chassis; and
   a circumferential storage space on the arm platform wherein the at least one robotic snake arm is capable of coiling around the circumference of the arm platform for storage in the circumferential storage space.

2. The robotic arm assembly of claim 1, further comprising a slip ring electrical connection locatable between the arm platform and the mobile robot chassis.

3. The robotic arm assembly of claim 1, wherein the at least one robotic snake arm comprises a plurality of robotic snake arms.

4. The robotic arm assembly of claim 1, further comprising at least one sensor attached to the robotic arm assembly.

5. The robotic arm assembly of claim 1, wherein at least one of the at least one robotic snake arm comprises at least one replaceable end effector.

6. A mobile robot, comprising:
   a mobile robot chassis with a vertical support member; and
   at least one rotatable arm platform mounted on the vertical support member, comprising:
      an arm platform rotatably connected to the vertical support member; and
      at least one robotic snake arm attached to the arm platform; and
      a rotary drive capable of applying force between the arm platform and the mobile robot chassis to rotate the robotic arm assembly about the vertical support member; and
      a circumferential storage space on the arm platform wherein the at least one robotic snake arm is capable of coiling around the circumference of the arm platform for storage in the circumferential storage space.

7. The mobile robot of claim 6, wherein the robotic arm assembly further comprises a slip ring electrical connection between the rotatably-connected arm platform and the chassis.

8. The mobile robot of claim 6, wherein the at least one robotic snake arm comprises a plurality of robotic snake arms.

9. The mobile robot of claim 6, further comprising at least one sensor attached to the robotic arm assembly.

10. The mobile robot of claim 6, further comprising at least one replaceable end effector attachable to an effector end of at least one of the at least one robotic snake arm.

11. A modular mobile robot, comprising:
    a mobile chassis adapted to accept at least one modular robotic assembly rotatably connectable to the mobile chassis;
    at least one modular robotic assembly connected to the mobile chassis and rotatable about a rotational axis;
    at least one robotic snake arm attached to the at least one modular robotic assembly; and
    a circumferential storage space on the modular robotic assembly wherein the at least one robotic snake arm is capable of coiling around the modular robotic assembly for storage in the circumferential storage space;
    wherein the at least one snake arm is capable of making a variety of arm movements by rotating the modular robotic assembly and actuating the at least one robotic snake arm.

12. A The modular mobile robot of claim 11, wherein the at least one rotatable modular robotic assembly has continuous unobstructed 360 degree rotation relative to the mobile chassis.

13. The modular mobile robot of claim 11, wherein each of the at least one rotatable modular robotic assembly further comprises a slip ring electrical connection between that modular robotic assembly and the mobile chassis.

14. The modular mobile robot of claim 11, wherein the at least one robotic snake arm comprises a plurality of robotic snake arms.

15. The modular mobile robot of claim 11, further comprising at least one sensor attached to the at least one modular robotic arm assembly.

16. The modular mobile robot of claim 15, further comprising a flexible sensor network, the flexible sensor network including a plurality of sensors.

17. The modular mobile robot of claim 11, wherein the at least one modular robotic arm assembly further comprises actuators and controls for the at least one robotic arm attached to that modular robotic arm assembly.

18. The modular mobile robot of claim 11, further comprising at least one replaceable end effector attachable to an effector end of at least one of the at least one robotic snake arm.

19. The modular robot of claim 11, wherein the at least one robotic snake-arm is attached to the at least one robotic arm assembly tangentially to the rotational axis.

20. The robotic arm assembly adapted for use with a mobile robot chassis of claim 1 wherein the at least one robotic snake arm comprises a plurality of ribs actuated by one or more cables.

21. The mobile robot of claim 6 wherein the at least one robotic snake arm comprises a plurality of ribs actuated by one or more cables.

22. The mobile robot of claim 6 further comprising a plurality of rotatable robotic snake arm assemblies mounted on the vertical support member.

23. The modular mobile robot of claim 11 wherein the at least one robotic snake arm comprises a plurality of ribs actuated by one or more cables.

24. The modular mobile robot of claim 11 wherein the variety of arm movements comprises circular movements, tangential movements, and swinging arc movements.

25. The modular mobile robot of claim 16 wherein the flexible sensor network further comprises a flexible covering.

26. The modular mobile robot of claim 16 wherein the flexible covering further comprises embedded components, padding, or visual treatments.

* * * * *